(12) United States Patent
Zheng et al.

(10) Patent No.: US 11,829,872 B2
(45) Date of Patent: Nov. 28, 2023

(54) METHOD FOR ULTRAFAST COMPOUND PLANE WAVE IMAGING BASED ON BROADBAND ACOUSTIC METAMATERIAL

(71) Applicant: Zhejiang University, Hangzhou (CN)

(72) Inventors: Yinfei Zheng, Hangzhou (CN); Chao Li, Hangzhou (CN); Dong Jiang, Hangzhou (CN)

(73) Assignee: Zhejiang University

( * ) Notice: Subject to any disclaimer, the term of this patent is extended or adjusted under 35 U.S.C. 154(b) by 691 days.

(21) Appl. No.: 16/864,584

(22) Filed: May 1, 2020

(65) Prior Publication Data
US 2021/0064993 A1 Mar. 4, 2021

(30) Foreign Application Priority Data
Aug. 30, 2019 (CN) .......................... 201910813822.4

(51) Int. Cl.
*G06N 3/08* (2023.01)
*G01S 15/89* (2006.01)

(52) U.S. Cl.
CPC ............ *G06N 3/08* (2013.01); *G01S 15/8977* (2013.01); *G01S 15/8995* (2013.01)

(58) Field of Classification Search
None
See application file for complete search history.

(56) References Cited

U.S. PATENT DOCUMENTS

2017/0299752 A1* 10/2017 Swett ...................... G10K 11/30
2018/0024265 A1* 1/2018 Swett ...................... G01V 1/52
367/35

(Continued)

FOREIGN PATENT DOCUMENTS

CN 106481385 A * 3/2017 ............... F01N 1/04
CN 108836389 A * 11/2018 ............... A61B 8/52

(Continued)

OTHER PUBLICATIONS

Wikipedia, Oscilloscope, (Year: 2019).*

(Continued)

*Primary Examiner* — Isam A Alsomiri
*Assistant Examiner* — Vikas Atmakuri
(74) *Attorney, Agent, or Firm* — Lerner David LLP (57) ABSTRACT

A method for ultrafast compound plane wave imaging based on a broadband acoustic metamaterial: controlling the transmit-receive ultrasonic probe to emit an ultrasonic signal at a preset transmit frequency and a first preset transmit angle, the preset transmit frequency is equal to a response frequency of the acoustic metamaterial structure; controlling the transmit-receive ultrasonic probe to receive, at a preset receive frequency and separately at a first preset receive angle, a second preset receive angle, a third preset receive angle, echo signals reflected by a measured object, where the preset receive frequency is n times the preset transmit frequency, the first preset receive angle is equal to the first preset transmit angle, the second preset receive angle is smaller than the first preset transmit angle, the third preset receive angle is larger than the first preset transmit angle; using the echo signals to reconstruct an image of the measured object.

8 Claims, 4 Drawing Sheets

(56) References Cited

U.S. PATENT DOCUMENTS

| | | | | |
|---|---|---|---|---|
| 2019/0266992 A1* | 8/2019 | Lee | ............... | G01S 7/52079 |
| 2020/0186936 A1* | 6/2020 | Kent | ............... | G10K 11/02 |
| 2020/0341141 A1* | 10/2020 | Urzhumov | ............... | G03H 3/00 |
| 2020/0375574 A1* | 12/2020 | Ling | ............... | A61B 8/5207 |
| 2021/0393238 A1* | 12/2021 | Guma | ............... | A61B 8/4272 |

FOREIGN PATENT DOCUMENTS

| | | | | |
|---|---|---|---|---|
| CN | 109428174 A | * | 3/2019 | ......... H01Q 15/0086 |
| CN | 109559359 A | * | 4/2019 | ........... G06N 3/0454 |
| DE | 102017209823 A1 | * | 12/2018 | ........... B06B 1/0666 |

OTHER PUBLICATIONS

Umchid, Development of calibration techniques for ultrasonic hydrophone probes in the frequency range from 1 to 100 MHz, Ultrasonics (Year: 2009).*
Frequency Response, Wikipedia (Year: 2019).*
Zhu, Holey structured metamaterial for acoustic deep-subwavelength imaging, Nature Physics, vol. 7, pp. 52-55 (Year: 2011).*
Oscilloscope, Wikipedia (Year: 2019).*

* cited by examiner

METHOD FOR ULTRAFAST COMPOUND PLANE WAVE IMAGING BASED ON BROADBAND ACOUSTIC METAMATERIAL

CROSS REFERENCE TO RELATED APPLICATIONS

This application claims priority from Chinese application number 201910813822.4, filed Aug. 30, 2019, the disclosure of which is hereby incorporated herein by reference.

TECHNICAL FIELD

The present invention relates to the technical field of ultrafast plane wave imaging, and in particular, to a method for ultrafast compound plane wave imaging based on a broadband acoustic metamaterial.

BACKGROUND

Currently, the quality of a medical ultrasonic image is judged based on its imaging depth and imaging quality.

In terms of the imaging quality, emergence of ultrafast plane waves revolutionizes the field of medical imaging, and allows an imaging frame rate to reach thousands of frames per second. This greatly improves the frame rate of conventional ultrasonic imaging. Different from a line-by-line focused imaging method in the conventional ultrasonic imaging, a surface-by-surface unfocused imaging method is used in ultrafast plane wave imaging. An unfocused transmit/receive mode is the key to the ultrafast plane wave imaging. In 2002, Tanter et al. measured shear wave velocity based on the ultrafast plane wave imaging, and proposed transient elastography. In 2003, the Bercoff team applied transient elastography to clinical research of breast cancer for the first time, which is also the first clinical application of ultrafast plane waves. The principle of elastography is measuring tissue displacement or shear wave velocity. Therefore, it is acceptable to increase the frame rate at the expense of image quality (contrast and resolution). To improve the image quality, in 2009, Montaldo et al. proposed a method for coherent compound plane wave imaging, which can greatly improve the imaging quality without affecting the frame rate. This method improves the image quality by increasing the quantity of plane waves at different transmit angles, and is a trade-off between the imaging frame rate and the imaging quality. Currently, the method for coherent compound imaging becomes a core of ultrafast imaging, and is widely used in various medical imaging conditions, especially blood flow imaging. In 2015, the Tanter team expanded the method for compound imaging and proposed a method for ultrafast multi-wave imaging that can improve the signal-to-noise ratio of an image without compromising the frame rate. However, this method requires a large amount of calculation and therefore takes a long time. This disadvantage limits its clinical application.

In terms of the imaging depth, a low-frequency transmit sequence allows for high penetration, but its imaging quality is poor. In recent years, research on acoustic metamaterials becomes a more promising research direction. In 2014, Nicholas Fang et al. used comsol simulation to design a double-negative acoustic metamaterial with negative mass density and negative bulk modulus, which provided a new idea and method for ultrasonic imaging. In 2015, the Thomas team realized an acoustic metamaterial with the double-negative property based on the Mie resonance effect. However, acoustic metamaterial development is still in the low-frequency stage, and research on high-frequency metamaterials is in the exploration stage.

In conclusion, the existing method for ultrafast plane wave imaging is based on coherent compound plane wave imaging. Because plane waves are unfocused, energy is lost and the imaging depth and imaging quality are affected.

SUMMARY

Based on this, it is necessary to provide a method for ultrafast compound plane wave imaging based on a broadband acoustic metamaterial, to improve imaging depth and imaging quality of plane wave imaging.

To achieve the above purpose, the present invention provides the following technical solutions.

The present invention provides a method for ultrafast compound plane wave imaging based on broadband acoustic metamaterial, where the method for ultrafast compound plane wave imaging is implemented by an apparatus for ultrafast compound plane wave imaging; the apparatus for ultrafast compound plane wave imaging includes a transmit-receive ultrasonic probe and an acoustic metamaterial structure; an ultrasonic signal emitted by the transmit-receive ultrasonic probe arrives at a measured object after passing through the acoustic metamaterial structure; and the transmit-receive ultrasonic probe further receives echo signals reflected by the measured object;

the method for ultrafast compound plane wave imaging specifically includes:

controlling the transmit-receive ultrasonic probe to emit an ultrasonic signal at a preset transmit frequency and a first preset transmit angle, where the ultrasonic signal arrives at the measured object after passing through the acoustic metamaterial structure, and the preset transmit frequency is equal to a response frequency of the acoustic metamaterial structure;

controlling the transmit-receive ultrasonic probe to receive, at a preset receive frequency and separately at a first preset receive angle, a second preset receive angle, and a third preset receive angle, the echo signals reflected by the measured object, where the preset receive frequency is n times the preset transmits frequency, and n>1; and the first preset receive angle is equal to the first preset transmit angle, the second preset receive angle is smaller than the first preset transmit angle, and the third preset receive angle is larger than the first preset transmit angle; and using the echo signals to reconstruct an image of the measured object.

Optionally, the using the echo signals to reconstruct an image of the measured object specifically includes:

using a deep learning algorithm to remove an artifact signal from the echo signals to obtain optimized echo signals; and using the optimized echo signals to reconstruct the image of the measured object.

Optionally, the response frequency of the acoustic metamaterial structure is determined by a response frequency determining apparatus; the response frequency determining apparatus includes a transmit probe, a receive probe, a signal generator connected to the transmit probe, and an oscilloscope connected to the receive probe; an output end of the transmit probe is connected to an input end of the receive probe through the acoustic metamaterial structure; and the signal generator is connected to the oscilloscope; and a method for determining the response frequency of the acoustic metamaterial structure is:

emitting, by the signal generator, a plurality of electronic signals of different frequencies at a preset step in a preset frequency range, where an electronic signal of each frequency is split into two paths, a first path of signal is directly displayed on the oscilloscope, and a second path of signal is displayed on the oscilloscope after sequentially passing through the transmit probe, the acoustic metamaterial structure, and the receive probe;

comparing waveforms of the two paths of electronic signals displayed on the oscilloscope at each frequency, and determining distortion, amplification, and delay of a waveform of the second path of signal corresponding to each frequency; and determining a frequency of the signal generator corresponding to the waveform of the second path of signal with the minimum distortion, maximum amplification, and minimum delay as the response frequency of the acoustic metamaterial structure.

Optionally, the using a deep learning algorithm to remove an artifact signal from the echo signals to obtain optimized echo signals specifically includes:

obtaining a training data set, where the training data set includes ultrasonic training signals containing an artifact signal and ultrasonic training signals with the artifact signal removed;

constructing a three-layer convolutional neural network;

training the three-layer convolutional neural network by using the ultrasonic training signals containing the artifact signal as input and the ultrasonic training signals with the artifact signal removed as output, to obtain a trained three-layer convolutional neural network; and inputting the echo signals into the trained three-layer convolutional neural network to obtain the optimized echo signals.

Optionally, the using the optimized echo signals to reconstruct the image of the measured object specifically includes:

reconstructing the image of the measured object based on the optimized echo signals by using a beamforming method.

Optionally, 1<n<3.

Optionally, the first preset receive angle and the first preset transmit angle are both A°, the second preset receive angle is A−δ°, the third preset receive angle is A+δ°, and δ>0.

Optionally, 5<δ<7.

Optionally, the preset frequency range is [0.5 MHz,15 MHz], and the preset step is 1 MHz.

Compared with the prior art, the present invention has the following beneficial effects:

The present invention provides a method for ultrafast compound plane wave imaging based on a broadband acoustic metamaterial. The method is implemented by an apparatus for ultrafast compound plane wave imaging. The apparatus includes a transmit-receive ultrasonic probe and an acoustic metamaterial structure. The method includes: controlling the transmit-receive ultrasonic probe to emit an ultrasonic signal at a preset transmit frequency and a first preset transmit angle, where the preset transmit frequency is equal to a response frequency of the acoustic metamaterial structure; controlling the transmit-receive ultrasonic probe to receive, at a preset receive frequency and separately at a first preset receive angle, a second preset receive angle, and a third preset receive angle, echo signals reflected by a measured object, where the preset receive frequency is n times the preset transmit frequency, the first preset receive angle is equal to the first preset transmit angle, the second preset receive angle is smaller than the first preset transmit angle, and the third preset receive angle is larger than the first preset transmit angle; and using the echo signals to reconstruct an image of the measured object. In the present invention, the preset transmit frequency is set to be equal to the response frequency of the acoustic metamaterial structure, to enhance incident energy and improve the imaging depth. The method for ultrafast compound imaging based on single-angle transmission and three-angle reception is proposed to increase echo information. In addition, a method for single-frequency transmission and n-fold-frequency reception is used to amplify received signal energy and improve the imaging quality.

BRIEF DESCRIPTION OF THE DRAWINGS

To describe the technical solutions in the embodiments of the present invention or in the prior art more clearly, the following briefly introduces the accompanying drawings required for describing the embodiments. Apparently, the accompanying drawings in the following description show merely some embodiments of the present invention, and a person of ordinary skill in the art may still derive other accompanying drawings from these accompanying drawings without creative efforts.

DETAILED DESCRIPTION

The following clearly and completely describes the technical solutions in the embodiments of the present invention with reference to accompanying drawings in the embodiments of the present invention. Apparently, the described embodiments are merely a part rather than all of the embodiments of the present invention. All other embodiments obtained by a person of ordinary skill in the art based on the embodiments of the present invention without creative efforts shall fall within the protection scope of the present invention.

To make objectives, characteristics, and advantages of the present invention more comprehensible, the following describes the present invention in more detail with reference to the accompanying drawings and specific implementations.

Figure 1:
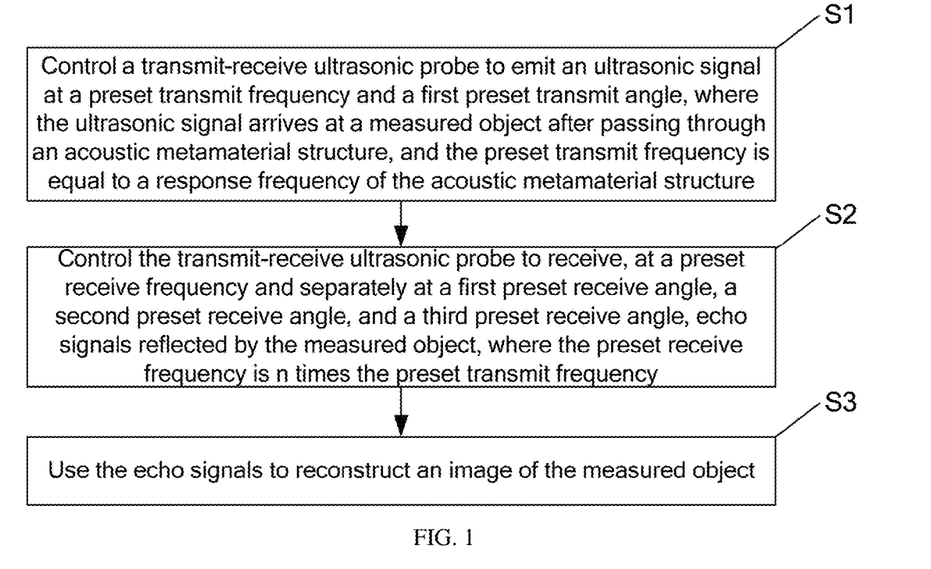
FIG. 1 is a flow chart of a method for ultrafast compound plane wave imaging based on a broadband acoustic metamaterial according to an embodiment of the present invention.
Figure 2:
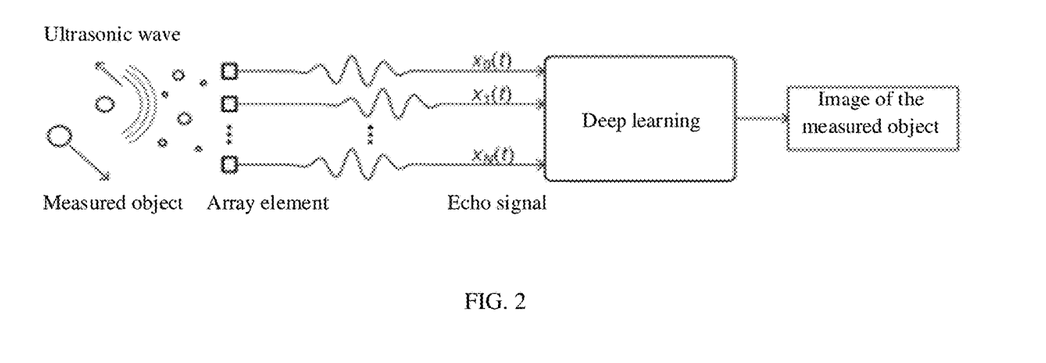
FIG. 2 is a schematic diagram of a method for ultrafast compound plane wave imaging based on a broadband acoustic metamaterial according to an embodiment of the present invention.

FIG. 1 is a flow chart of a method for ultrafast compound plane wave imaging based on a broadband acoustic metamaterial according to an embodiment of the present invention. FIG. 2 is a schematic diagram of a method for ultrafast compound plane wave imaging based on a broadband acoustic metamaterial according to an embodiment of the present invention.

Figure 3:
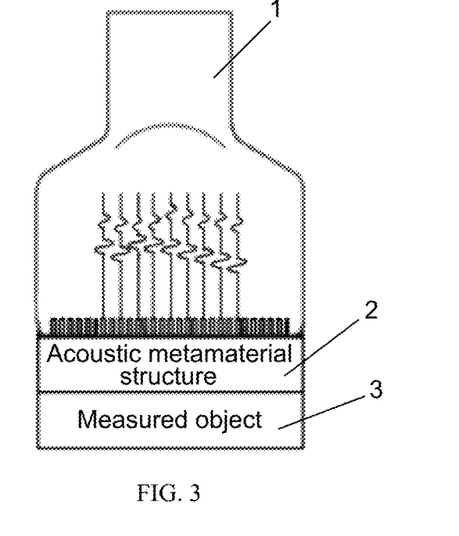
FIG. 3 is a schematic structural diagram of an apparatus for ultrafast compound plane wave imaging according to an embodiment of the present invention.

Referring to FIG. 1 and FIG. 2, the method for ultrafast compound plane wave imaging based on a broadband acoustic metamaterial in the embodiment is implemented by an apparatus for ultrafast compound plane wave imaging. FIG. 3 is a schematic structural diagram of an apparatus for ultrafast compound plane wave imaging according to an embodiment of the present invention. Referring to FIG. 3, the apparatus for ultrafast compound plane wave imaging includes a transmit-receive ultrasonic probe 1 and an acoustic metamaterial structure 2. An ultrasonic signal emitted by the transmit-receive ultrasonic probe 1 arrives at a measured object 3 after passing through the acoustic metamaterial structure 2. The transmit-receive ultrasonic probe 1 further receives echo signals reflected by the measured object 3. The acoustic metamaterial structure 2 has a broadband characteristic.

Figure 4:
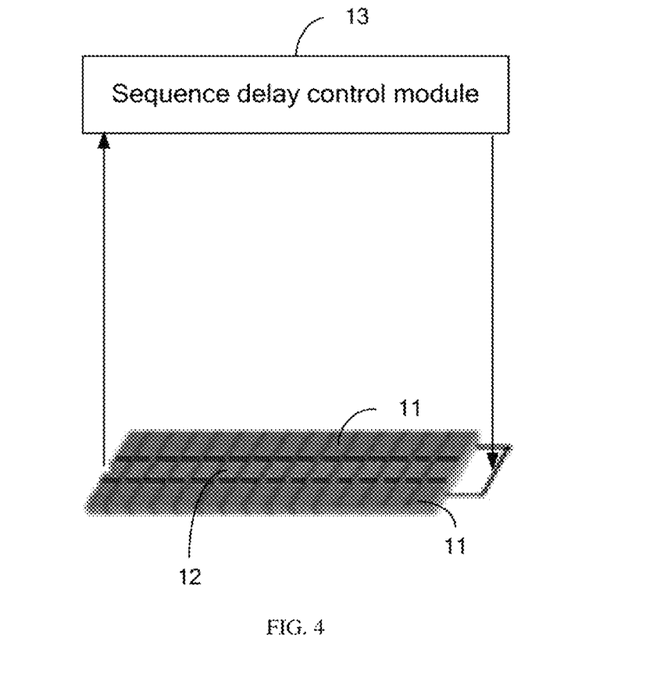
FIG. 4 is a schematic structural diagram of a transmit-receive ultrasonic probe according to an embodiment of the present invention.

FIG. 4 is a schematic structural diagram of a transmit-receive ultrasonic probe according to an embodiment of the present invention. Referring to FIG. 4, the transmit-receive ultrasonic probe 1 includes a transmit array element 11, a receive array element 12, and a sequence delay control module 13. The transmit array element 11 (transmit sequence) and the receive array element 12 (receive sequence) are separately connected to the sequence delay control module 13. The sequence delay control module 13 is configured to control a transmit frequency and a transmit angle of the transmit array element 11, and control a receive frequency and a receive angle of the receive array element 12.

The method for ultrafast compound plane wave imaging specifically includes the following steps.

Figure 5:
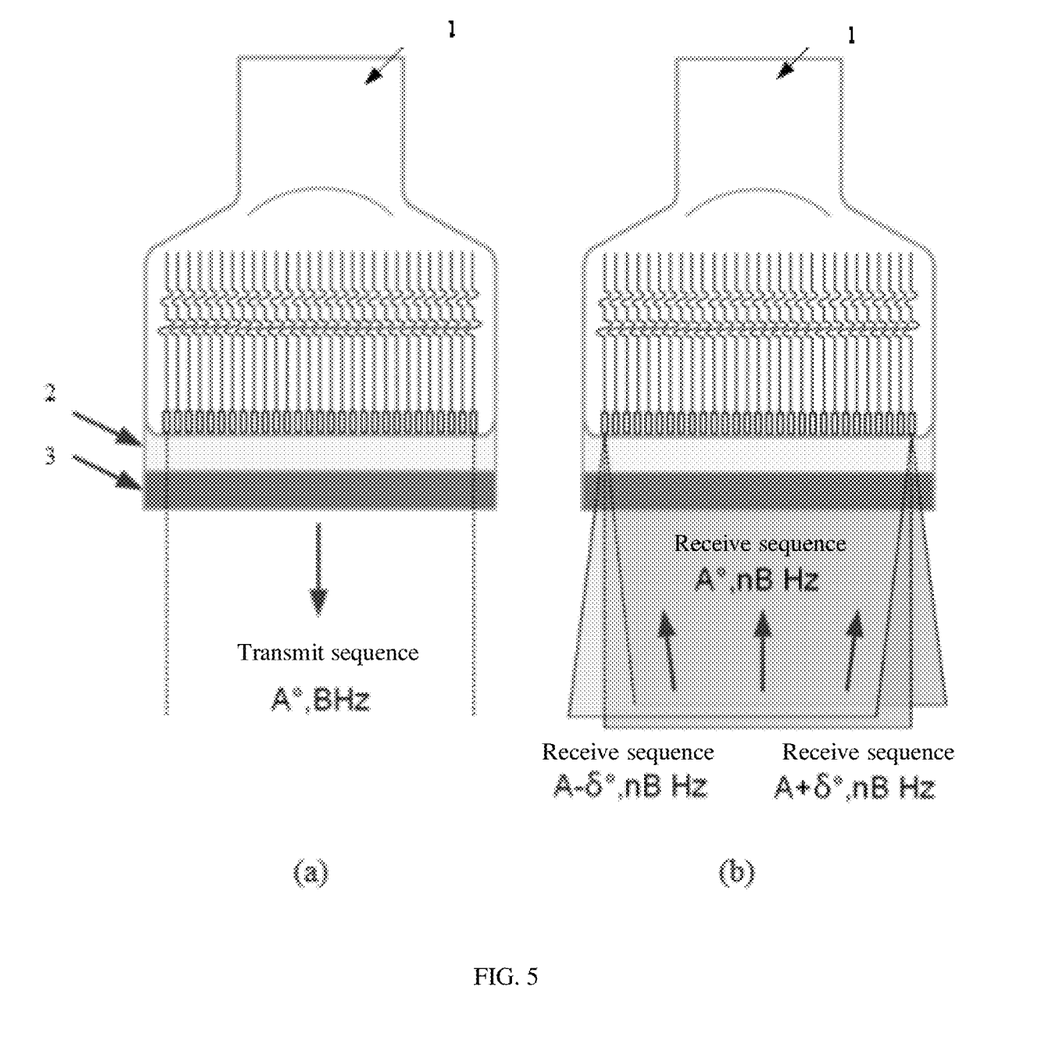
FIG. 5 is a schematic diagram of single-angle transmission and three-angle reception according to an embodiment of the present invention.

Step S1: control the transmit-receive ultrasonic probe to transmit an ultrasonic signal at a preset transmit frequency and a first preset transmit angle. The ultrasonic signal arrives at the measured object after passing through the acoustic metamaterial structure. The preset transmit frequency is equal to a response frequency of the acoustic metamaterial structure. The preset transmit frequency is a center frequency of the transmit sequence. The response frequency of the acoustic metamaterial structure is a frequency at which a metamaterial exerts its optimal performance. A schematic diagram of implementation of this step is shown in part (a) of FIG. 5.

Figure 6:
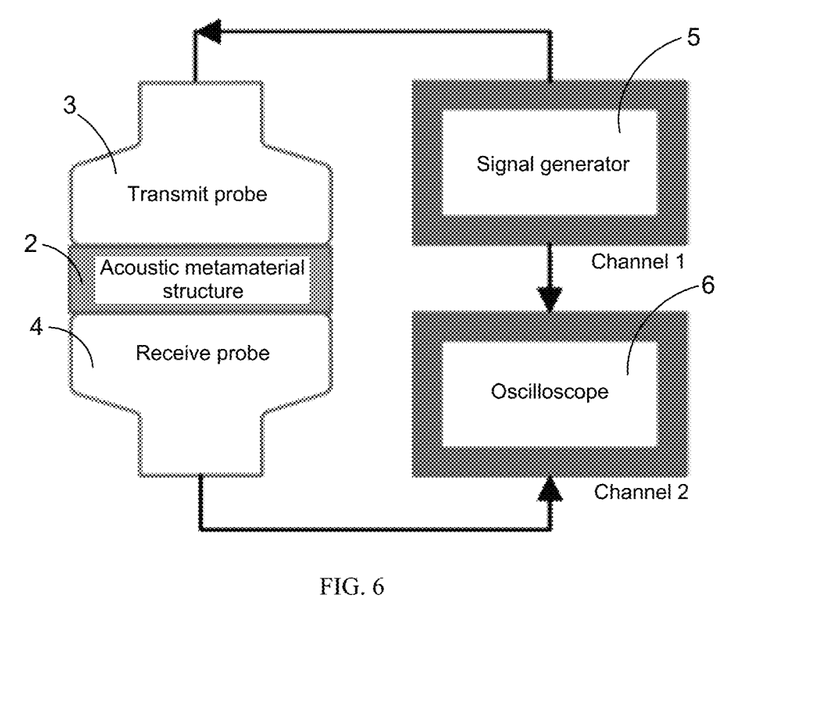
FIG. 6 is a schematic structural diagram of a response frequency determining apparatus according to an embodiment of the present invention.

The response frequency of the acoustic metamaterial structure is determined by a response frequency determining apparatus using a pre-experiment method. FIG. 6 is a schematic structural diagram of a response frequency determining apparatus according to an embodiment of the present invention. Referring to FIG. 6, the response frequency determining apparatus includes a transmit probe 3, a receive probe 4, a signal generator 5 connected to the transmit probe 3, and an oscilloscope 6 connected to the receive probe 4. An output end of the transmit probe 3 is connected to an input end of the receive probe 4 through the acoustic metamaterial structure 2. The signal generator 5 is connected to the oscilloscope 6. The transmit probe 3 and the receive probe 4 are both single-array-element probes.

In this embodiment, a method for determining the response frequency of the acoustic metamaterial structure is as follows:

(1) The signal generator emits a plurality of electronic signals of different frequencies at a preset step in a preset frequency range. An electronic signal of each frequency is split into two paths. A first path of signal (a signal in channel 1) is directly displayed on the oscilloscope. A second path of signal (a signal in channel 2) is displayed on the oscilloscope after sequentially passing through the transmit probe, the acoustic metamaterial structure, and the receive probe.

(2) Compare waveforms of the two paths of electronic signals displayed on the oscilloscope at each frequency, and determine distortion, amplification, and delay of a waveform of the second path of signal corresponding to each frequency.

(3) Determine a frequency of the signal generator corresponding to the waveform of the second path of signal with the minimum distortion, maximum amplification, and minimum delay as the response frequency of the acoustic metamaterial structure.

In an optional implementation, the preset frequency range is [0.5 MHz,15 MHz], and the preset step is 1 MHz. In this implementation, a specific process of determining the response frequency of the acoustic metamaterial structure by using the pre-experiment method is provided.

The frequency of the signal generator is sequentially adjusted from 0.5 MHz to 15 MHz (at the step of 1 MHz), and a total of 15 groups of signals in channel 1 and channel 2 at different frequencies are recorded. Received signals in channel 2 and transmitted signals in channel 1 in all groups are compared based on the principle of minimum distortion, optimal amplification, and minimum delay. A group in which a waveform of a signal in channel 2 has the minimum distortion, maximum amplification, and minimum delay is selected. In this case, a transmit frequency of a signal in channel 1 in this group matches the acoustic metamaterial. That is, the frequency of the signal generator at this moment is determined as the response frequency of the acoustic metamaterial structure.

Figure 7:
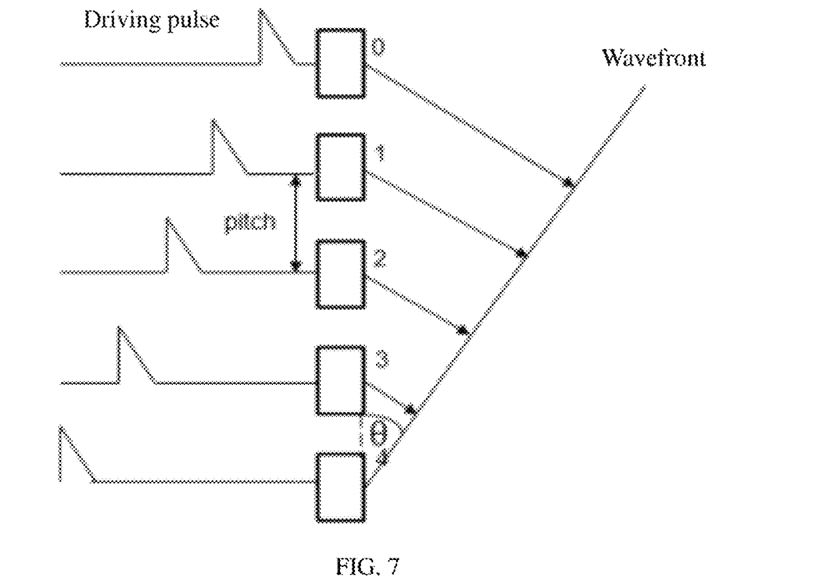
FIG. 7 is a diagram of a control principle of a sequence delay control module controlling an array element to emit an ultrasonic wave at a certain transmit angle according to an embodiment of the present invention.

In this embodiment, the first preset transmit angle is obtained through controlling by the sequence delay control module 13. FIG. 7 is a diagram of a control principle of a sequence delay control module controlling an array element to emit an ultrasonic wave at a certain transmit angle according to an embodiment of the present invention. Referring to FIG. 7, a specific control process is as follows: When the sequence delay control module 13 controls the transmit array element to emit a plane wave, and a transmit angle of the transmit array element is zero, that is, a plane wave at zero angle is transmitted, the sequence delay control module 13 only needs to control a plurality of transmit array elements to simultaneously perform transmission. When the transmit angle of the transmit array element is not zero, that is, when a plane wave at a deflection angle is transmitted, the sequence delay control module 13 controls to apply a delay to each transmit array element. A formula for calculating a delay of transmit array element x is $$\tau_x = \frac{x * \text{pitch} * \sin\theta}{c},$$

where θ indicates the deflection angle, pitch indicates an array element interval, and c indicates acoustic velocity. By applying such a delay, different array elements emit plane waves in succession. The plane waves form a plane (wavefront). An angle between the wavefront and the array element is θ.

Step S2: control the transmit-receive ultrasonic probe to receive, at a preset receive frequency and separately at a first preset receive angle, a second preset receive angle, and a third preset receive angle, the echo signals reflected by the measured object. The preset receive frequency is n times the preset transmit frequency. That is, the preset transmit frequency is B Hz, and the preset receive frequency is nB Hz. n>1. The first preset receive angle is equal to the first preset transmit angle. The second preset receive angle is smaller than the first preset transmit angle. The third preset receive angle is larger than the first preset transit angle. In this embodiment, the first preset receive angle and the first preset transmit angle are both A°, the second preset receive angle is A−δ°, and the third preset receive angle is A+δ°, where δ indicates the magnitude of the deflection angle, and δ>0. A schematic diagram of implementation of this step is shown in part (b) of FIG. 5.

In a preferred implementation, 1<n<3.

In a preferred implementation, 5<δ<7.

Step S3: use the echo signals to reconstruct an image of the measured object. This step specifically includes:

31: use a deep learning algorithm to remove an artifact signal from the echo signals to obtain optimized echo signals. This step is specifically as follows:

A training data set were obtained, where the training data set includes ultrasonic training signals containing an artifact signal and ultrasonic training signals with the artifact signal removed.

A three-layer convolutional neural network was constructed. A first layer is responsible for feature extraction, a second layer is responsible for nonlinear filtering, and a third layer is responsible for feature combination. A model formula of each layer is a ReLU activation function, that is, $f(x)=ReLU(W*x+b)$, where x indicates input data, and w and b indicate parameters of the model.

The three-layer convolutional neural network was trained by using the ultrasonic training signals containing the artifact signal as input and the ultrasonic training signals with the artifact signal removed as output, to obtain a trained three-layer convolutional neural network.

The echo signals were input to the trained three-layer convolutional neural network to obtain the optimized echo signals.

32: use the optimized echo signals to reconstruct the image of the measured object. Specifically, the image of the measured object was reconstructed based on the optimized echo signals by using a beamforming method.

The method for ultrafast compound plane wave imaging based on a broadband acoustic metamaterial in this embodiment has the following advantages:

1. The problems of plane wave imaging depth (poor penetration) and imaging quality (low resolution and contrast) are resolved.
2. The preset transmit frequency is set to be equal to the response frequency of the acoustic metamaterial structure. This enhances incident energy and improves the imaging depth.
3. In an existing commonly used method for ultrafast compound plane wave imaging, coherent compound imaging is performed on echo signals of plane waves at different transmit angles ( . . . , −A°, 0°, +A°, . . . ). In step S1 and step S2 in this embodiment, the method for ultrafast compound imaging based on single-angle transmission and three-angle reception is adopted. When transmission is performed at a single angle of +A° and reception is performed at three angles: A−δ°, A+0°, and A+δ°, data volume of the echo signals increases accordingly, thereby improving the imaging quality.
4. In conventional ultrasonic imaging, a transmit sequence and a receive sequence are at the same frequency. In this embodiment, ultrafast compound plane wave imaging is performed based on single-frequency transmission and n-fold-frequency reception. The transmit/receive frequency matches the optimal double negative characteristic of the acoustic metamaterial. This can further amplify energy of received signals and improve the imaging quality.
5. Deep learning processing is performed on the received echo signals, the image is reconstructed, and artifacts are removed to further improve the imaging quality.

In this paper, several examples are used for illustration of the principles and embodiments of the present invention. The description of the foregoing embodiments is used to help illustrate the method of the present invention and the core principles thereof. In addition, those skilled in the art can make various modifications in terms of specific embodiments and scope of application in accordance with the teachings of the present invention. In conclusion, the content of this specification shall not be construed as a limitation to the present invention.

What is claimed is:

1. A method for ultrafast compound plane wave imaging based on broadband acoustic metamaterial, wherein
the method for ultrafast compound plane wave imaging is implemented by an apparatus for ultrafast compound plane wave imaging; the apparatus for ultrafast compound plane wave imaging comprises a transmit-receive ultrasonic probe and an acoustic metamaterial structure; an ultrasonic signal emitted by the transmit-receive ultrasonic probe arrives at a measured object after passing through the acoustic metamaterial structure; and the transmit-receive ultrasonic probe further receives echo signals reflected by the measured object;
the method for ultrafast compound plane wave imaging specifically comprises:
controlling the transmit-receive ultrasonic probe to emit an ultrasonic signal at a preset or fixed transmit frequency and a first preset transmit angle, wherein the ultrasonic signal arrives at the measured object after passing through the acoustic metamaterial structure, and the preset transmit frequency is equal to a response fixed frequency of the acoustic metamaterial structure;
controlling the transmit-receive ultrasonic probe to receive, at a preset or fixed receive frequency and separately at a first preset receive angle, a second preset receive angle, and a third preset receive angle, the echo signals reflected by the measured object, wherein the preset receive frequency is n times the preset transmits frequency, and n>1; and the first preset receive angle is equal to the first preset transmit angle, the second preset receive angle is smaller than the first preset transmit angle, and the third preset receive angle is larger than the first preset transmit angle; and
using the echo signals to reconstruct an image of the measured object;
wherein the response fixed frequency of the acoustic metamaterial structure is measured by a response frequency determining apparatus; the response fixed frequency determining apparatus comprises a transmit probe, a receive probe, a signal generator connected to the transmit probe, and an oscilloscope connected to the receive probe; an output end of the transmit probe is connected to an input end of the receive probe through the acoustic metamaterial structure; and the signal generator is connected to the oscilloscope; and measuring the response frequency of the acoustic metamaterial structure is done by:
  (i) emitting, by the signal generator, a plurality of electronic signals of different frequencies at a preset step in a preset frequency range, wherein an electronic signal of each frequency is split into two paths, a first path of signal is directly displayed on the oscilloscope, and a second path of signal is displayed on the oscilloscope after sequentially passing through the transmit probe, the acoustic metamaterial structure, and the receive probe;
  (ii) comparing waveforms of the two paths of electronic signals displayed on the oscilloscope at each frequency, and determining distortion, amplification, and delay of a waveform of the second path of signal corresponding to each frequency; and
  (iii) determining a frequency of the signal generator corresponding to the waveform of the second path of signal with the minimum distortion, maximum amplification, and minimum delay as the response frequency of the acoustic metamaterial structure.

2. The method for ultrafast compound plane wave imaging based on broadband acoustic metamaterial according to claim 1, wherein the using the echo signals to reconstruct an image of the measured object specifically comprises:
  using a deep learning algorithm to remove an artifact signal from the echo signals to obtain optimized echo signals; and
  using the optimized echo signals to reconstruct the image of the measured object.

3. The method for ultrafast compound plane wave imaging based on broadband acoustic metamaterial according to claim 2, wherein the using a deep learning algorithm to remove an artifact signal from the echo signals to obtain optimized echo signals specifically comprises:
  obtaining a training data set, wherein the training data set comprises ultrasonic training signals containing an artifact signal and ultrasonic training signals with the artifact signal removed;
  constructing a three-layer convolutional neural network;
  training the three-layer convolutional neural network by using the ultrasonic training signals containing the artifact signal as input and the ultrasonic training signals with the artifact signal removed as output, to obtain a trained three-layer convolutional neural network; and
  inputting the echo signals into the trained three-layer convolutional neural network to obtain the optimized echo signals.

4. The method for ultrafast compound plane wave imaging based on broadband acoustic metamaterial according to claim 2, wherein the using the optimized echo signals to reconstruct the image of the measured object specifically comprises:
  reconstructing the image of the measured object based on the optimized echo signals by using a beamforming method.

5. The method for ultrafast compound plane wave imaging based on broadband acoustic metamaterial according to claim 1, wherein $1<n<3$.

6. The method for ultrafast compound plane wave imaging based on broadband acoustic metamaterial according to claim 1, wherein the first preset receive angle and the first preset transmit angle are both A°, the second preset receive angle is A−δ°, the third preset receive angle is A+δ°, and δ>0.

7. The method for ultrafast compound plane wave imaging based on broadband acoustic metamaterial according to claim 6, wherein $5<δ<7$.

8. The method for ultrafast compound plane wave imaging based on broadband acoustic metamaterial according to claim 1, wherein the preset frequency range is [0.5 MHz, 15 MHz], and the preset step is 1 MHz.

* * * * *